Patented Aug. 23, 1932

1,873,900

UNITED STATES PATENT OFFICE

STUART PARMELEE MILLER, OF NEW YORK, N. Y., ASSIGNOR TO THE BARRETT COMPANY, OF NEW YORK, N. Y., A CORPORATION OF NEW JERSEY

REMOVAL OF PHENOLS FROM WASTE AND OTHER LIQUORS

No Drawing.      Application filed June 30, 1927. Serial No. 202,737.

This invention relates to the elimination of phenols from waste liquor and other liquors, such as weak ammoniacal liquor etc.

The presence of phenol in waste liquors, such as the waste liquor from ammonia stills, is objectionable, and prevents the disposal of such waste liquors in rivers and other bodies of water from which drinking water is obtained. As a result, various methods of treatment of the waste liquors have been proposed to remove phenols therefrom.

One of the methods of removing phenols from waste liquors, etc., involves the use of benzol or light oils rich in benzol, such as are recovered in the benzol and light oil scrubbers of a by-product coke oven plant. This method, however, requires a large amount of the benzol, and there is a very considerable loss of benzol in the process, due in part to its volatility and the difficulty of recovering it completely, and due in part to its solubility in the liquor extracted therewith. The extraction of the phenols from the waste liquor requires intimate contact of the benzol and waste liquor, which promote the dissolving of benzol in the waste liquor, up to the limit of its solubility therein; while the low specific gravity of the benzol, being less than that of the waste liquor and of the caustic solution employed for separating the phenols from the bezol solution, promotes the vaporization of the benzol from the supernatant layer thereof, which vaporization is aided by the low boiling point of the benzol and the fact that the extractions are ordinarily carried out on warm liquors.

The present invention provides an improved method of extracting phenols from waste liquor and other phenol-containing liquors, and particularly from weak ammoniacal liquor, in which the objections above referred to are obviated or minimized.

According to the present invention, the phenol-containing liquor is subjected to extraction with a relatively heavy and high boiling neutral oil, of specific gravity greater than that of the liquor extracted, and of a high boiling point such that loss of the extracting oil by vaporization is prevented or greatly reduced.

The heavy neutral oil employed in the present process has a specific gravity greater than that of water, and of the waste liquor or weak liquor to be extracted, so that, after bringing the liquor and the oil into intimate contact to effect the extraction, the oil will settle as a lower layer, beneath the supernatant layer of liquor. The specific gravity of the oil should be sufficiently greater than that of the liquor, so that the separation into layers will readily take place after the liquor and oil have been intimately admixed with each other. When the oil, after extraction of phenols from the waste liquor, is itself extracted with caustic alkali solution to separate the phenols therefrom, it will also settle as a lower layer beneath the caustic alkali solution, if the caustic alkali solution is of lower specific gravity. If, however, a caustic alkali solution of high concentration and of greater specific gravity is employed, the oil layer will form a supernatant layer above the caustic layer after the extraction. The specific gravity of the oil employed and that of the caustic alkali solution employed should be sufficiently different to permit any separation of the two liquids into layers after the caustic extraction of the oil. If a dilute caustic solution is employed, the oil may be of greater specific gravity, in which case it will settle below the caustic layer after the extraction; while if a strong caustic solution is employed of high specific gravity, e. g., 1.275, the oil will have a sufficiently lower specific gravity to permit it to separate as a supernatant layer above the caustic layer after the extraction. In general, therefore, the specific gravity of the oil employed in the present process is greater than that of the liquor to be extracted therewith, and the specific gravities of the oil and of the caustic solution employed for extracting the phenols should be sufficiently different so that they readily separate from each other after the extraction of the phenols from the oil.

The neutral oil employed in the present process is also of relatively high boiling point, being free from benzol and lower boiling constituents of low specific gravity, so that the large loss of benzol which accompanies the use of benzol in present processes, is avoided. The higher specific gravity of the oil, which causes it to form a layer below the layer of liquor extracted therewith, also protects the oil from vaporization by preventing it from coming in contact with the atmosphere during the settling and separation operations.

The oils produced by the distillation of coal tar, according to ordinary methods of distillation, contain considerable amounts of tar acids or phenols, and, if brought into contact with waste liquor, would give up phenols to the waste liquor, instead of extracting phenols from the waste liquor. These oils, therefore, cannot be employed for extracting phenols from the waste liquor, since their use would defeat the very purpose of the treatment, and would give a liquor of increased phenol content. As distinguished from such oils, the oils employed in the present process are neutral oils, from which tar acids or phenols have been removed and recovered. When the phenols have been thus removed, the remaining neutral oil can be effectively employed for extracting tar acids or phenols from waste liquor, weak ammoniacal liquor, etc.

In its broader aspects, the present invention includes the use of neutral oils produced by the distillation of coal tar in the ordinary way and the extraction of selected fractions of the distillate to remove phenols therefrom and to give the neutral oils employed in the process. The production of such oils, however, requires the distillation of tar in tar stills, and such distillation is commonly effected at tar distillation plants removed from the coke oven or gas retort plants at which the waste liquors or weak ammoniacal liquors are produced.

The neutral oils particularly contemplated for use in the invention are oils directly produced at the coke oven or other coal distillation plant from the coal distillation gases, or by distillation of the tar by direct contact with the hot coal distillation gases, and separation of the oil from the resulting enriched gases.

In the ordinary operation of coke oven by-product plants and gas retorts, the gases are cooled for the separation of tar therefrom, which is shipped to tar distillation plants and there distilled. When, however, the hot coal distillation gases are subjected to cleaning to remove heavy tar and pitch constituents therefrom, for example, by treating the hot gases with an electrical precipitator, there is directly produced a clean gas containing clean vapor, and, upon cooling the clean gas, clean oils can be directly obtained. By treating the gases at a sufficiently high temperature, the cleaned gases will contain vapors of heavy high boiling oils, which can be condensed by cooling of the gases. By this cooling of the gases to a lower regulated temperature, an oil of specific gravity greater than one and containing phenols or tar acids, can be directly obtained. This oil will be a clean oil free from tarry and pitch constituents. It cannot, however, be directly employed for extracting phenols from phenol-containing liquors, because the amount of phenols which such liquors contain is so small, and the phenol content of the oil is so great relatively, that phenols would be extracted by the liquor from the oil, instead of vice versa. Before its use, therefore, the oil is extracted to remove phenols therefrom and to give a neutral oil.

The method of producing clean oils of this type directly from hot coal distillation gases is described more in detail in my companion applications Serial Nos. 181,366, 188,438, 171,955, 197,029 and 199,644.

When coal tar produced at by-product coke oven or gas retort plants is subjected to distillation by bringing it into intimate contact with hot coal distillation gases, as described in these prior applications, the gases employed for distilling the tar are greatly enriched in oil vapors. By subjecting the resulting enriched gases to a cleaning treatment, such as with an electrical precipitator at a sufficiently high temperature, the suspended tarry and pitch constituents can be separated therefrom, leaving clean enriched gases, from which, by cooling, clean oils can be directly recovered at the coke oven or gas retort plants. These oils will be free from tarry or pitch constituents, but will contain phenols or tar acids in considerable amounts. They cannot be directly employed for extracting phenols from phenol-containing liquor, but the neutral oil produced therefrom by the extraction of phenols can advantageously be so employed.

The directly recovered oils, after extraction to remove tar acids or phenols therefrom, may contain a large percentage of naphthalene. Part of the naphthalene can be separated from such oils, in some cases, by cooling the oil to crystallize part of the naphthalene and by separating the resulting oil from the naphthalene crystals. By regulating the temperature at which the oils are condensed, oils can be directly produced sufficiently low in naphthalene to permit them to be employed without treatment for separation of naphthalene therefrom. If naphthalene is present, the oil should be employed at a sufficiently high temperature to prevent separation of naphthalene during the process.

When directly recovered oils are employed, their specific gravity can be regulated by regulating the temperature of condensation, or by fractional condensation or rectification of the directly recovered clean oils.

The directly recovered clean oil, before being employed for the extraction of phenol from the phenol-containing liquors, is subjected to preliminary treatment for the removal of phenols therefrom. This can be readily effected by extraction of the oil with caustic alkali, using, for example, a ten per cent solution of caustic soda, and bringing the oil and caustic soda solution into intimate contact with each other to cause the phenols contained in the oil to combine with the caustic soda to form a phenolate solution, and by permitting the phenolate solution and oil to separate from each other. The resulting neutral oil can then be employed in the process of the present invention. The carbolate solution can be treated, for example with carbon dioxide, to set free the phenols, which can thus be obtained as a valuable product of the process, and which can be further refined if desired.

The phenol content in waste liquor is small in quantity, for example, amounting to only around 1.5 to 3 grams per liter in many cases; and it is important to effect substantially complete extraction and removal of such phenols from the liquor.

In order to effect complete extraction of the phenols from the liquor, the liquor must be brought into intimate contact with a sufficient amount of the extracting oil, or into contact with repeated amounts of oil. This extraction can advantageously be effected in a continuous manner by causing countercurrent flow of the oil and liquor, and bringing the flowing streams into intimate contact with each other. With such countercurrent flow, the fresh neutral oil, free from phenol, is brought into contact with the already partially extracted liquor, and completes the extraction, while the fresh liquor, with its normal phenol content, is brought into contact first with oil containing some phenol, but capable of removing some of the phenols from the liquor. By a sufficiently prolonged and intimate countercurrent flow of the liquor and oil, a complete or substantially complete extraction of the phenols from the liquor can be effected.

Instead of operating in a continuous countercurrent manner, the liquor can be subjected to repeated extraction with fresh amounts of oil, using fresh phenol-free oil for completing the extraction of the phenols from the liquor. Such successive treatments can also be carried out on a countercurrent principle, by employing fresh oils for completing the extraction of phenols from the partially extracted liquor, and by using the resulting phenol-containing oil for effecting preliminary extraction of part of the phenols from fresh liquor.

The phenol-containing oil resulting from the extraction of phenols from the liquor is in turn subjected to the action of a caustic soda solution or other phenol-combining reagent, to separate the phenol from the oil so that it can be further used for the extraction of further amounts of phenols from the liquor. As above pointed out, the caustic soda solution employed may have a greater specific gravity than that of the oil, where a high concentration of caustic soda is employed, or it may have a lower specific gravity than that of the oil, where a dilute caustic soda solution is employed and where the oil is one of higher specific gravity. There should be a sufficient difference in the specific gravity of the caustic soda solution and of the oils to permit ready separation thereof after the oil and solution have been brought into intimate contact for the combination of the phenols with the caustic soda. After bringing the caustic soda solution and the oil into intimate contact with each other, the oil and phenolate solutions are permitted to separate from each other. The resulting neutral oil can be returned for further extraction of phenols from phenol-containing liquor; while the carbolate solution if it still contains sufficient caustic soda, may be employed for extracting additional phenols from additional quantities of oil. This extraction of phenols from the oil with caustic soda solution can be carried out in a continuous countercurrent manner, or by treating successive batches of oil with the caustic soda solution.

When the caustic soda solution has become sufficiently concentrated in carbolate and too weak in caustic content for further extraction of phenols, it can be treated for the recovery of the phenols therefrom; for example, by subjecting it to the action of carbon dioxide to form sodium carbonate and to set free the phenols, and by completing the treatment of the separated tar acids with a small amount of sulphuric acid to complete the setting free of the phenols from phenolate dissolved therein. The phenols obtained in this way from waste liquor are impure, but can be subjected to further refining or purification to obtain refined products therefrom.

The process of the present invention can advantageously be employed for the extraction of phenols from weak ammoniacal liquor before the liquor is subjected to distillation for the recovery of ammonia therefrom, by bringing the weak ammoniacal liquor into intimate contact with the heavy oil. The phenol-free ammoniacal liquor can then be subjected to distillation for the recovery of ammonia therefrom, including treatment with lime to set free combined ammonia. Such treatment has the advantage that phenols will be absent from the ammoniacal liquor during distillation and will have no opportunity of combination with the lime employed, while the residual liquors will also be substantially free from phenols.

After repeated or continued use of the neutral oil for extracting phenols from the phenol-containing liquor, it may become contaminated and require purification. This can advantageously be accomplished by returning the impure neutral oil to the collector main of the coal distillation system and subjecting it to distillation by direct contact with the hot coal distillation gases. The vapors from the distillation will be carried along with the hot coke oven gases and the oil will be again recovered along with oils contained in the coke oven gases; the gases are cleaned with an electrical precipitator at a high temperature, and the distilled oils will be recovered as part of the clean oils condensed from the gases after the cleaning treatment. In this way the contaminated oils can be purified without any considerable added expense of distillation and again recovered as clean oils, or replaced by a corresponding amount of clean oils otherwise produced.

The employment of the directly recovered oils, directly recovered from coal distillation gases, after the extraction of these oils to free them from phenols and to give neutral oils, has the advantage, among others, that such oils can be directly recovered at coke oven and other coal distillation plants, where they are to be employed as solvents for the extraction of phenols from phenol-containing liquors. The expense of transportation of the oils is thus eliminated, and the oils are directly produced at the plants where they are to be employed, at the same time that other valuable products are directly produced as a part of the same recovery process.

I claim:

1. The method of removing phenols from phenol-containing liquors containing small amounts thereof, which comprises bringing the liquor into intimate contact with a heavy neutral coal tar oil having a specific gravity greater than that of the liquor.

2. The method of removing phenol from phenol-containing liquors containing small amounts thereof, which comprises subjecting the liquor to intimate contact with a heavy neutral oil directly recovered from coal distillation gases and having phenols extracted therefrom, said oil having a specific gravity greater than that of the liquor treated therewith.

3. The method of removing phenols from phenol-containing liquors containing small amounts thereof, which comprises subjecting the liquor to prolonged intimate countercurrent contact with heavy neutral coal tar oil having a specific gravity greater than that of the liquor.

4. The method of removing phenols from phenol-containing liquors containing small amounts thereof, which comprises subjecting the liquor to repeated extraction with a heavy neutral coal tar oil having a specific gravity greater than that of the liquor, to effect progressive removal of phenols from the liquor.

5. The method of removing phenols from phenol-containing liquors containing small amounts thereof, which comprises bringing the liquor into intimate contact with a heavy neutral coal tar oil having a specific gravity greater than that of the liquor, treating the resulting phenol-containing oil with a phenol-combining agent to separate the phenol therefrom and returning the resulting neutral oil for further extraction of phenols from the phenol-containing liquor.

6. The method of treating ammoniacal liquors, which comprises subjecting the same to extraction with heavy neutral coal tar oil, having a specific gravity greater than that of the liquor, to effect removal of phenol from the liquor, and subsequently subjecting the resulting liquor to distillation for the recovery of ammonia therefrom.

7. The method of recovering phenols from phenol-containing liquors, which comprises bringing into intimate contact with the phenol-containing liquors neutral coal tar oil having a specific gravity greater than that of water and resulting from the extraction of oil condensed from coal distillation gases which have been cleaned and enriched by the distillation of tar in them to extract phenols therefrom.

8. The method of removing phenols from weakly ammoniacal phenol containing liquors containing small amounts thereof which comprises bringing the liquor into intimate contact with a heavy neutral coal tar oil obtained by extracting a coal tar oil with caustic solution and having a specific gravity greater than that of the liquor.

9. The method of removing phenols from phenol containing liquors containing small amounts thereof which comprises bringing an aqueous liquor containing about 1.5 to 3.0 grams of phenols per liter into intimate contact with a heavy neutral coal tar oil obtained by extracting a coal tar oil with caustic solution and having a specific gravity greater than that of the liquor.

In testimony whereof I affix my signature.

STUART PARMELEE MILLER.